United States Patent [19]

Tada

[11] 3,912,950

[45] Oct. 14, 1975

[54] BISTABLE MULTIVIBRATOR CIRCUIT

[75] Inventor: Masahiro Tada, Tokyo, Japan

[73] Assignee: Sony Corporation, Tokyo, Japan

[22] Filed: Feb. 4, 1974

[21] Appl. No.: 439,291

[30] Foreign Application Priority Data

Feb. 6, 1973 Japan .............................. 48-15890

[52] U.S. Cl. .......... 307/289; 307/225 R; 307/247 R; 307/291; 328/206

[51] Int. Cl.$^{2}$ .......................................... H03K 3/286

[58] Field of Search.... 307/289, 291, 223 R, 225 R, 307/247 R; 328/206

[56] References Cited

UNITED STATES PATENTS 3,177,374 4/1965 Simonian et al. ............... 307/247 R 3,247,399 4/1966 Moody ............................ 307/247 R 3,728,560 4/1973 Treadway ........................... 307/289

*Primary Examiner*—John Zazworsky

*Attorney, Agent, or Firm*—Lewis H. Eslinger; Alvin Sinderbrand

[57] ABSTRACT

A bistable multivibrator circuit, which is readily adaptable to monolithic integrated circuit technology, combines master and slave portions, thus reducing the components needed to provide a master/slave circuit operation when the multivibrator is used as a frequency divider.

6 Claims, 12 Drawing Figures

| TIME | CLOCK IS | 5 | 6 | 14 | 13 | 7 | 8 |
|---|---|---|---|---|---|---|---|
| $T_1$ | HIGH | OFF | OFF | —▷\|— | —▷\|— | OFF | ON |
| $T_2$ | LOW | OFF | ON | OFF | ON | ON | OFF |
| $T_3$ | HIGH | OFF | OFF | —▷\|— | —▷\|— | ON | OFF |
| $T_4$ | LOW | ON | OFF | ON | OFF | OFF | ON |

| TIME | CLOCK IS | P | $\bar{P}$ | Q | $\bar{Q}$ |
|---|---|---|---|---|---|
| $T_1$ | HIGH | $2V_{be}$ | $V_{be}$ | $V_{be}$ | 0 |
| $T_2$ | LOW | $V_{be}$ | 0 | 0 | $V_{be}$ |
| $T_3$ | HIGH | $V_{be}$ | $2V_{be}$ | 0 | $V_{be}$ |
| $T_4$ | LOW | 0 | $V_{be}$ | $V_{be}$ | 0 |

BISTABLE MULTIVIBRATOR CIRCUIT

BACKGROUND OF THE INVENTION

This invention relates to bistable multivibrators and particularly to bistable multivibrators having combined master and slave sections.

Bistable multivibrators fabricated as monolithic integrated circuit (IC) devices often comprise separate master and slave sections with circuit interconnections and inputs to the multivibrator. It is desirable to reduce the number of components which are required to implement a master/slave bistable multivibrator or flip-flop function. The state of conductivity of the flip-flop is changed at every change of level of a clock input signal.

SUMMARY OF THE INVENTION

It is one object of this invention to provide an improved bistable multivibrator circuit, or so-called T-type flip-flop, which is a flip-flop actuated by a trigger pulse.

It is another object of this invention to reduce the number of components in a master/slave emitter-coupled flip-flop circuit.

It is a further object of this invention to eliminate the feedback circuit connection between both of the master/slave sections.

It is a still further object of this invention to utilize common current sources for both sections of a master flip-flop and a gate circuit.

According to this invention, a feedback circuit connection is eliminated in the flip-flop circuit components, and accordingly, there is no undesirable interference, such as might be caused by an oscillation between the circuit connection during the operation of the flip-flop. The number of circuit components on the monolithic IC chip of the flip-flop is reduced.

Further, the flip-flop is operated with good stabilization regardless of variations in the circuit environment, such as temperature drift and variation of battery potential of the circuit.

In accordance with a preferred embodiment of this invention, a bistable multivibrator comprises first and second sections, each having at least two transistors. The collectors of all of the transistors in the first and second sections are connected to a first voltage supply terminal. The emitters of the transistors in one of the two sections are connected to a reference potential through a current source to which input, or clock, signals are supplied.

DETAILED DESCRIPTION OF THE EMBODIMENTS

Figures 1, 2, 3:
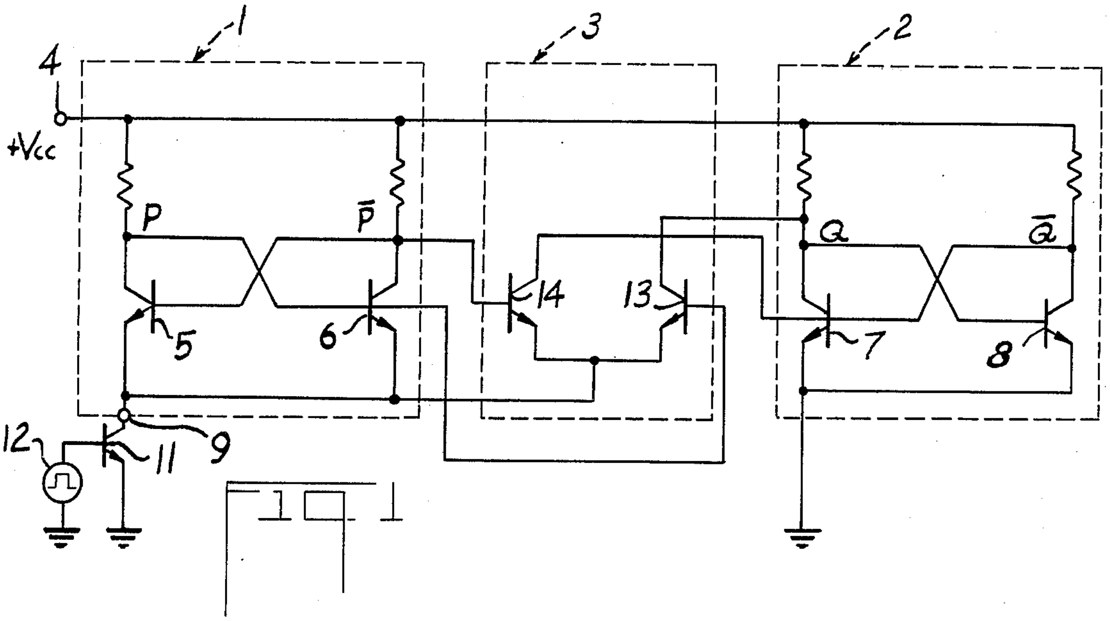
FIG. 1 is a schematic diagram of one embodiment of this invention.
FIG. 2 is a table of the conditions in each state of the transistors for the circuit of FIG. 1.
FIG. 3 is a table of input clock and resultant output voltages for the circuit of FIG. 1.

FIG. 1 shows a so-called T-type flip-flop which is used as a frequency divider and is composed of a first, or master, flip-flop 1, a second, or slave, flip-flop 2, and a current steering gate circuit 3. In this embodiment, all of the transistors are NPN type and have first, second and control electrodes, which, as shown, are respectively the collector, emitter and base of each transistor, and the collectors of the transistors included in flip-flops 1 and 2 are all connected to a first voltage supply or positive battery terminal 4 that supplies an operating voltage $+V_{cc}$, while ground constitutes a second voltage supply terminal.

In the master flip-flop 1, the collector terminal of each of the two transistors 5 and 6 is connected to the base terminal of the other of these transistors 6 and 5, respectively, and the emitter terminals of both transistors 5 and 6 are connected to each other and to a first common terminal 9.

Similarly, the collectors of the transistors 7 and 8 of the slave flip-flop 2 are connected to the base terminals of the opposite transistors 8 and 7, respectively, and the emitter terminals of both transistors 7 and 8 are connected to the second voltage supply terminal or the ground or reference potential directly.

The first common terminal 9 of the master flip-flop 1 is connected to the reference potential or second voltage supply terminal by way of a constant current switching source, which is composed of a transistor 11 controlled by a clock signal 12.

The gate circuit 3 is composed of a pair of transistors 13 and 14 having their emitters connected to each other at a second common terminal. The emitter electrodes of transistors 13 and 14 are also connected to the first common terminal 9, and the base electrodes of the transistors 13 and 14 are connected to collector electrodes of the transistors 5 and 6, respectively. The collector electrodes of the transistors 13 and 14 are connected to the collector electrodes of the transistors 7 and 8, respectively.

The operation of the circuit will be described in detail with reference to FIGS. 2 to 4. In the table in FIG. 2, the terms "on" and "off" represent "conductive" and "non-conductive," respectively. The diode symbol indicates that the transistors 13 and 14 are biased so that their base-collector terminals act like diodes.

Figure 4A:
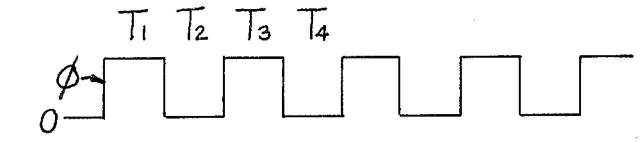
FIGS. 4A-4E show representative waveforms of the input clock voltage and the output voltages at the output terminals of the master and slave sections.

Initially, the transistor 8 of the slave flip-flop 2 is conductive and the transistor 7 is non-conductive. The clock pulses $\phi$ at the terminal 9 are shown in FIG. 4A, and when one of these clock pulses raises the terminal 9 to its high level at the beginning of the interval $T_1$, the transistors 5, 6, 13, and 14 are all non-conductive. Accordingly, it should be assumed that the base-collector junctions of the transistors 13 and 14 act as diode devices. These transistors operate as so-called reverse transistor devices. This stage produces the relationships listed in the first line of the table in FIG. 2 during the time $T_1$.

Therefore, current is, in turn, fed from the battery or first voltage supply terminal 4 through the base-collector electrodes of the transistor 14 and the collector-emitter electrodes of the transistor 8 to ground. Since the transistor 8 is set to be fully conductive initially, the collector electrodes of the transistors 8 and 14 are at zero potential. Accordingly, the base potential of the transistor 14 relative to ground is shown in FIG. 4C as having a value $V_{be}$ that corresponds to the potential drop between the base and collector of the transistor 14.

Figure 4B:
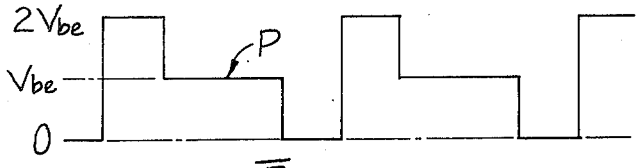
Figure 4C:
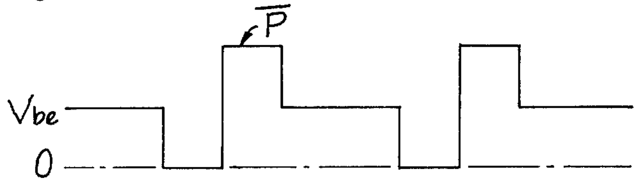
Figure 4D:
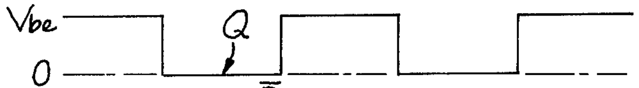
Figure 4E:
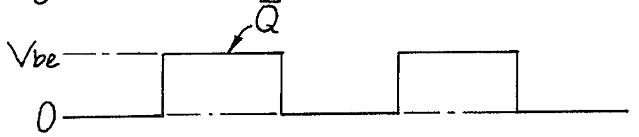

On the other hand, the base potential of the transistor 13 has a value of $2V_{be}$ as shown in FIG. 4B, which value corresponds to the potential drop across the base-collector junction of the transistor 13 plus the potential drop across the base-emitter junction of the transistor 8. Also, the collector potentials of the transistors 7 and 8 are shown in FIGS. 4D and 4E, respectively.

The voltage relationships of the collector electrodes P, $\overline{P}$, Q, and $\overline{Q}$ due to each clock pulse are indicated in the table in FIG. 3. Thus, when the clock pulse $\phi$ at the terminal 9 is at a high level, both of the transistors 13 and 14 operate as diodes.

When the clock signal voltage at the terminal 9 drops to a low value during the time $T_2$, the transistor 6 becomes conductive and the transistor 5 continues to be non-conductive due to the different base bias of the transistors 13 and 14. In this manner, the condition of the slave flip-flop 2, i.e. with the transistor 7 non-conductive and the transistor 8 conductive, is relayed to the master flip-flop 1, and therefore, the base potentials of the transistor 13 and 14 go to the levels $V_{be}$ and zero, respectively, as shown in FIGS. 4B and 4C.

Simultaneously, the transistors 13 and 14 are biased to act like normal transistor devices. In this state, the transistor 13 is conductive and the transistor 14 is non-conductive, the condition of the slave flip-flop 2 is reversed. As shown by the relationships listed in FIGS. 2 and 3, the waveforms in FIGS. 4D and 4E, the transistor 7 is conductive and the transistor 8 is non-conductive during the period $T_2$.

Now let it be assumed that the voltage of the clock pulse at the terminal 9 goes high, as it does during time $T_3$. The transistors 13 and 14 are again biased to act like diodes. Therefore, the base potential of the transistor 13 stays at the value $V_{be}$ which value corresponds to the voltage drop across the collector-base junction of the transistor 13, and the base potential of the transistor 14 goes to the value $2V_{be}$, which value corresponds to the voltage drop across the collector-base junction of the transistor 14 plus the voltage drop across the base-emitter junction of the transistor 7, as shown in FIGS. 3 and 4C.

Now let it be assumed again that the voltage of the clock pulse goes low during the period $T_4$ and the transistor 5 is conductive and transistor 6 is non-conductive. In that case, the condition of the slave flip-flop 2, in which the transistor 7 is conductive and the transistor 8 is non-conductive, is relayed to the master flip-flop 1. That causes the base potential of the transistor 13 to become zero and the base potential of the transistor 14 to reach the value $V_{be}$, as shown in the bottom line in the table in FIG. 3 and in the waveforms in FIGS. 4B and 4C during the time $T_4$. Consequently, the transistor 7 becomes non-conductive and the transistor 8 becomes conductive.

As is described above, the slave flip-flop 2 has the two stable states, successively, and the frequency divided output pulse is obtained at the collector terminals, which are the output terminals, of the transistors 7 and 8. As is shown in FIGS. 4D and 4E, the output pulse has one-half the frequency of the input frequency and reverses its polarity at each negative-going pulse of the input pulse signal $\phi$.

In this embodiment, since there are no feedback connections between the slave and master flip-flops, undesirable interferences, such as an unadvoidable oscillation caused by the feedback loop, are prevented. Further, the number of circuit components required for a T-type of flip-flop is much less than the usual number.

Figure 5:
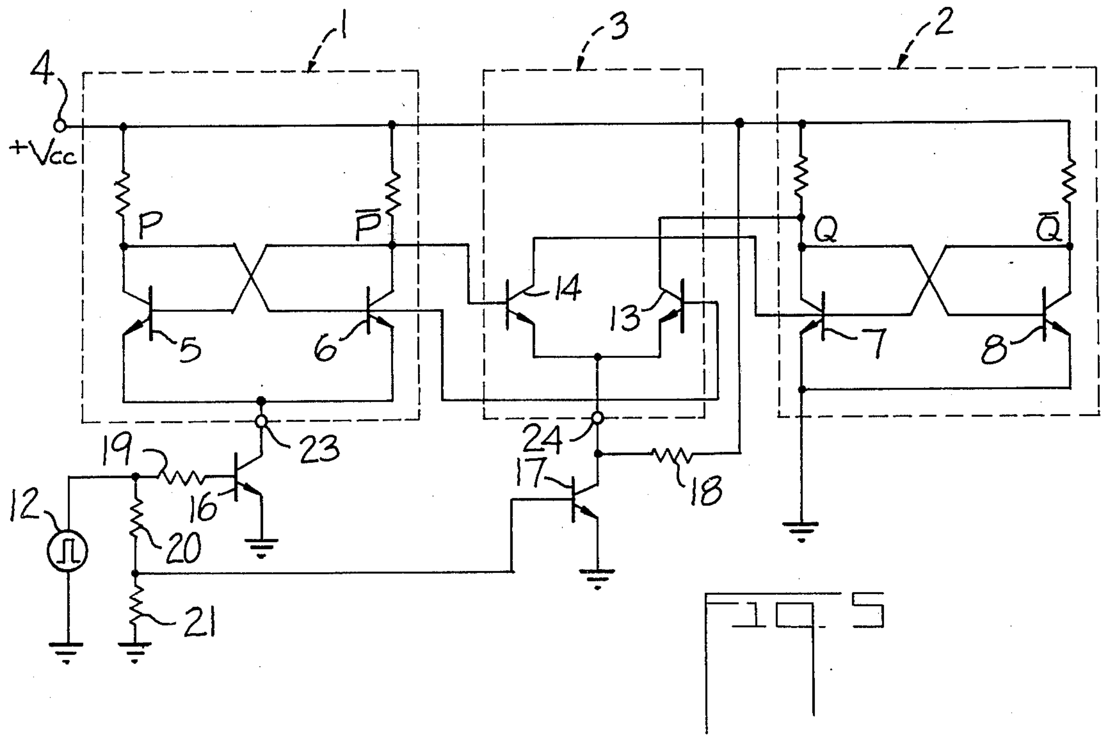
FIGS. 5 to 8 are schematic diagrams of other embodiments of this invention.

FIG. 5 shows another embodiment of the circuit that may operate with better reliability than the embodiment in FIG. 1. In the embodiment shown in FIG. 5, switching clock signals are applied separately to the master flip-flop 1 and the gate circuit 3 so that the transistors 5 and 6 have the proper ON-OFF timing relative to the transistors 13 and 14. two transistors 16 and 17 have their base electrodes connected to the source 12 while the collectors of transistors 16 and 17 are respectively connected to the first and second common terminals indicated at 23 and 24. In order to operate the transistors 16 and 17 properly, bias setting resistors 18-21 are selected to have suitable resistance values. The transistors 16 and 17 are biased so that, when the input clock pulse goes high, the transistor 16 is made conductive a short time before the transistor 17 becomes conductive. Therefore, the high value of the emitter potential of the master flip-flop 1 becomes the reference low potential (zero voltage), while the condition of the slave flip-flop 2 is accurately held by the master flip-flop 1. On the other hand, the transistors 13 and 14 which operate as diode devices at first, are gradually changed so that they operate as normal transistor devices after the transistors 5 and 6 become conductive.

At the time the operation of the transistors 13 and 14 changes so that they operate as normal transistor devices, one of the gate transistors 13 or 14 conducts collector current from one of the slave transistors 8 or 7, and then the slave flip-flop 2 changes its state of conductivity while the transistors 16 and 17 are fully conductive.

When the input pulse from the source 12 goes low, the transistor 17 becomes non-conductive a little before the transistor 16 does and accordingly, the transistors 13 and 14 change to the diode mode of operation quickly. When the transistor 16 is completely non-conductive, the battery current flows from the load resistors of the master flip-flop 1 to the base-collector electrodes of the gate transistors 13 and 14 and accordingly the collector electrodes of the transistors 5 and 6 are clamped at the voltage levels $2V_{be}$ and $V_{be}$, respectively, as described previously. These cyclical alternations may be carried out with greater reliability by the embodiment of FIG. 5 than by the embodiment of FIG. 1, regardless of variations of temperature of the circuit load and variations of battery voltage.

According to the embodiment shown in FIG. 1, when the transistors 13 and 14 are operated as so-called reverse transistors, in which their $h_{fe}$ is approximately 1 to 2, and even if the transistors 5 and 6 are non-conductive, a small leakage current may flow from the emitter electrodes of the transistors 5 and 6 to the emitter-collector junction of the transistor 13, the transistor 7 and the ground (zero potential).

This is the condition that exists during the period $T_3$ in FIG. 2. During this period, the first common terminal 9 may become zero potential and consequently the input clock signal cannot operate to cause the transistor 11 to conduct correctly because the collector electrode of the transistor 11 is zero. In the second embodiment shown in FIG. 5, however, since the emitter electrodes of the master flip-flop 1 and the gate circuit 3 are separated from each other, there is no similar current loop. Moreover, since the second common terminal 24 connected to the collector of the transistor 17 is supplied with a predetermined bias current through the resistor 18, the collector potential of the transistor 17 never drops to zero. Therefore, the input signal from the clock source 12 can cause the transistor 17 to become conductive without any interference.

Figure 6:
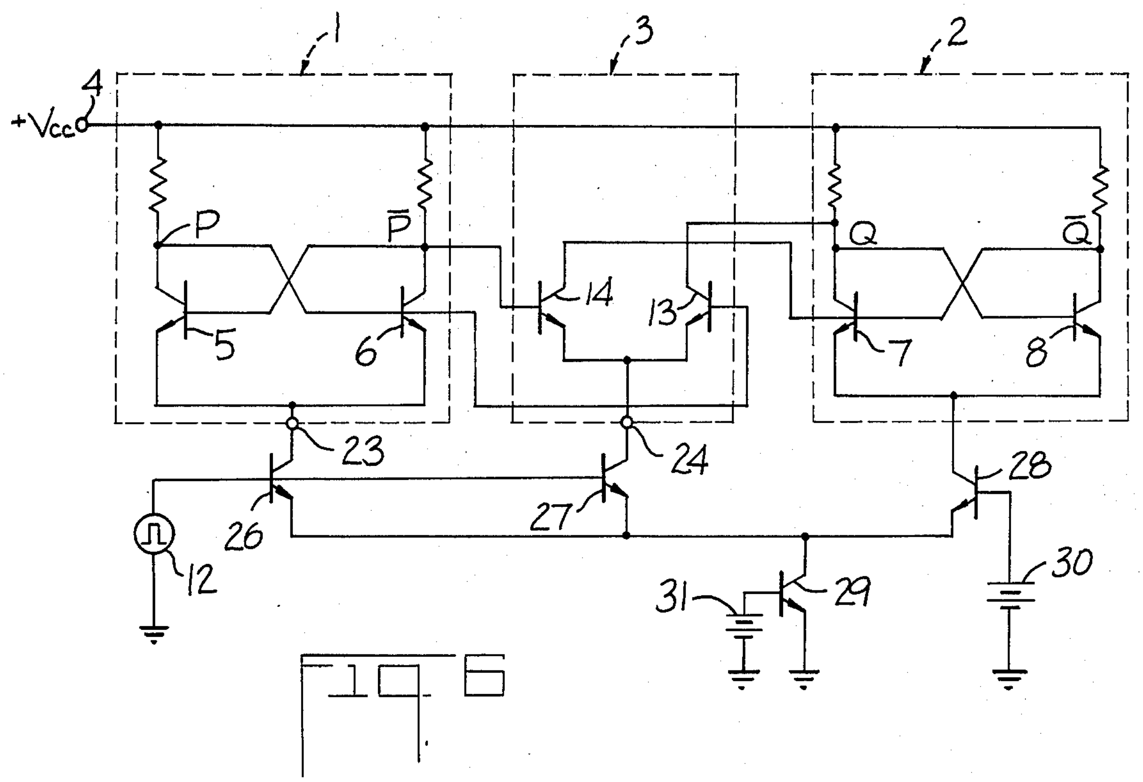

In FIG. 6, there is another embodiment of this invention capable of operating as a high frequency divider. The input frequency in this embodiment may be 80 MHz, whereas the input frequency in the prior embodiment may be 5 to 10 MHz. In the embodiment in FIG. 6 a differential amplifier is composed of transistors 26-28. The emitter electrodes of the transistors 26-28 are connected to ground together through a constant current source composed of a transistor 29 biased by a battery source 31. A battery 30 biases the transistor 28, and the input signals of the transistors 27 and 28 are always out-of-phase.

Since the emitter potential of the transistors 13 and 14 and the collector electrodes of the transistors 7 and 8 are biased by the out-of-phase relationship, the transistors 13 and 14, which are operated as reverse transistors, i.e., as diode devices, are quickly changed to operate as normal transistors. That is, stray capacitances of the diode junction of the transistors 13 and 14 are quickly charged. Then the reverse transistors 13 and 14 are changed into normal transistors quickly because of the high collector bias of the transistors 7 and 8.

Figure 7:
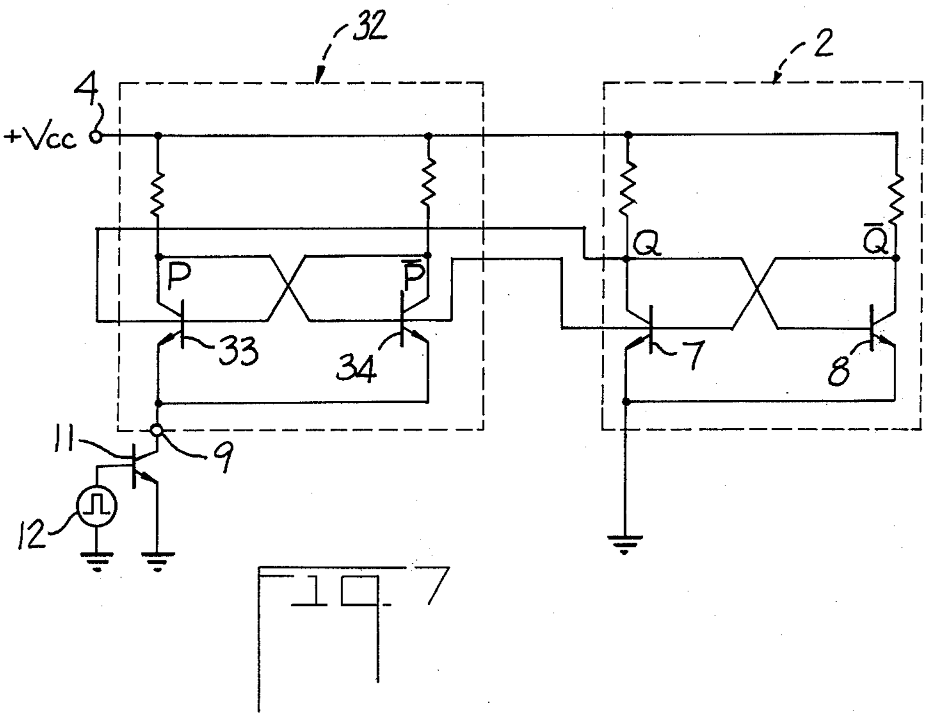

In FIG. 7, there is shown another embodiment of this invention in which the number of circuits is further reduced. In this embodiment, the gate circuit and the master flip-flop circuit are combined as a single circuit 32.

In detail a single transistor 33 replaces the transistors 5 and 14 of FIG. 1 which have their base electrodes connected to each other. A single transistor 34 in FIG. 7 replaces the transistors 6 and 13 which have their electrodes connected to each other in the prior embodiments. As shown in FIG. 7, the transistors 33 and 34 have their collector electrodes connected to the first voltage supply terminal 4, while the collectors of transistors 33 and 34 are also connected to the bases of transistors 34 and 33, respectively, and to the collectors of transistors 8 and 7, respectively, of the second flip-flop 2. Further, the emitters of transistors 33 and 34 are connected to the first common terminal 9, while the emitters of transistors 7 and 8 are connected together to ground, as in FIG. 1. The operation of this circuit is the same as that of the first embodiment shown in FIG. 1, but the embodiment of FIG. 7 is much preferred if it is to be constructed as an integrated circuit because it has fewer components than the embodiment in FIG. 1.

Figure 8:
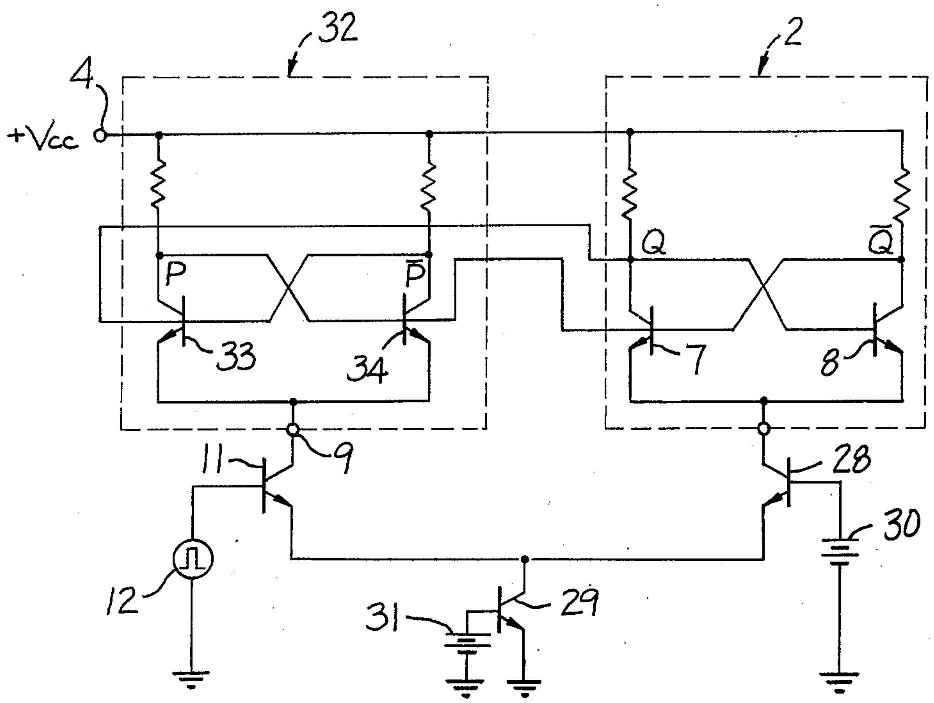

FIG. 8 shows another embodiment of this invention in which the circuit is modified to include features of the embodiments shown in FIGS. 6 and 7. The first common terminal 9 the first flip-flop and the second common terminal, to which the emitters of the second flip-flop are connected, are connected to a differential amplifier comprising the transistors 11 and 28 driven by an out-of-phase input signal as in FIG. 6, and the master flip-flop and the gated circuit are combined in the single circuit 32 as shown in FIG. 7. This circuit can also operate in response to a high frequency input signal.

What is claimed is:

1. A bistable multivibrator comprising:
first and second voltage supply terminals;
a first flip-flop comprising first and second transistors each having first, second and control electrodes, the first electrodes of said first and second transistors being connected to said first voltage supply terminal;
at least a first common terminal having said second electrodes of said first and second transistors connected thereto;
at least one current source connected between said first common terminal and said second voltage supply terminal for supplying a clock input signal to said first common terminal to cause said first and second transistors to alternate between a first condition in which both are nonconductive and a second condition in which only one of said first and second transistors is conductive;
a second flip-flop comprising third and fourth transistors each having first, second and control electrodes, the first electrodes of said third and fourth transistors being connected to said first voltage supply terminal;
means connecting said second electrodes of the third and fourth transistors to said second voltage supply terminal; and
means coupling said first electrodes of said first and second transistors, respectively, to the control electrodes of said third and fourth transistors, respectively, said third and fourth transistors being alternately conductive and their states of conductivity being reversed in response to control from said first flip-flop, said coupling means being responsive to the condition of conductivity of said third and fourth transistors to determine the state of conductivity of said first and second transistors in said second condition such that, each time said first and second transistors change from their first condition to their second condition in response to said clock input signal, the states of conductivity of said first and second transistors are reversed from their prior states of conductivity during the preceding second condition of said first and second transistors.

2. A bistable multivibrator according to claim 1; in which said current source comprises:
an emitter-collector circuit of a fifth transistor, said clock input signal being applied to the base of said fifth transistor;
an emitter-collector circuit of a sixth transistor included in said means connecting said second electrodes of the third and fourth transistors to the second voltage supply terminal, means connecting together said fifth and sixth transistors so as to constitute a differential amplifier; and
a constant current transistor having an emitter-collector circuit connected in series with said emitter-collector circuit of both of said fifth and sixth transistors.

3. A bistable multivibrator according to claim 1; in which said means coupling said first electrodes of the first and second transistors with said control electrodes of the third and fourth transistors, respectively, includes a current steering gate circuit comprising:

fifth and sixth transistors each having first, second and control electrodes, the first electrodes of said fifth and sixth transistors being coupled to the first electrodes of said third and fourth transistors, respectively, and the control electrodes of said fifth and sixth transistors being coupled to the first electrodes of said first and second transistors; and a second common terminal connected to the second electrodes of said fifth and sixth transistors.

4. A bistable multivibrator according to claim 3; in which said first and second common terminals are directly connected together.

5. A bistable multivibrator according to claim 3; comprising, in addition, a second current source connected to said second common terminal for supplying a clock input signal thereto to actuate said current steering gate circuit separately from said first flip-flop.

6. A bistable multivibrator according to claim 3; in which said current source comprises:

1. a seventh transistor having an emitter-collector circuit included in said means connecting said second electrodes of the third and fourth transistors to the second voltage supply terminal,

2. eighth and ninth transistors having their base-emitter input circuits connected in parallel and their emitter-collector circuits connected, respectively, to said first and second common terminals, and

3. a common transistor connected in series with the emitter-collector circuits of all of said seventh, eighth and ninth transistors, the clock input signal being applied to the base of said eighth and ninth transistors.

* * * * *